United States Patent Office 3,075,137
Patented Jan. 22, 1963

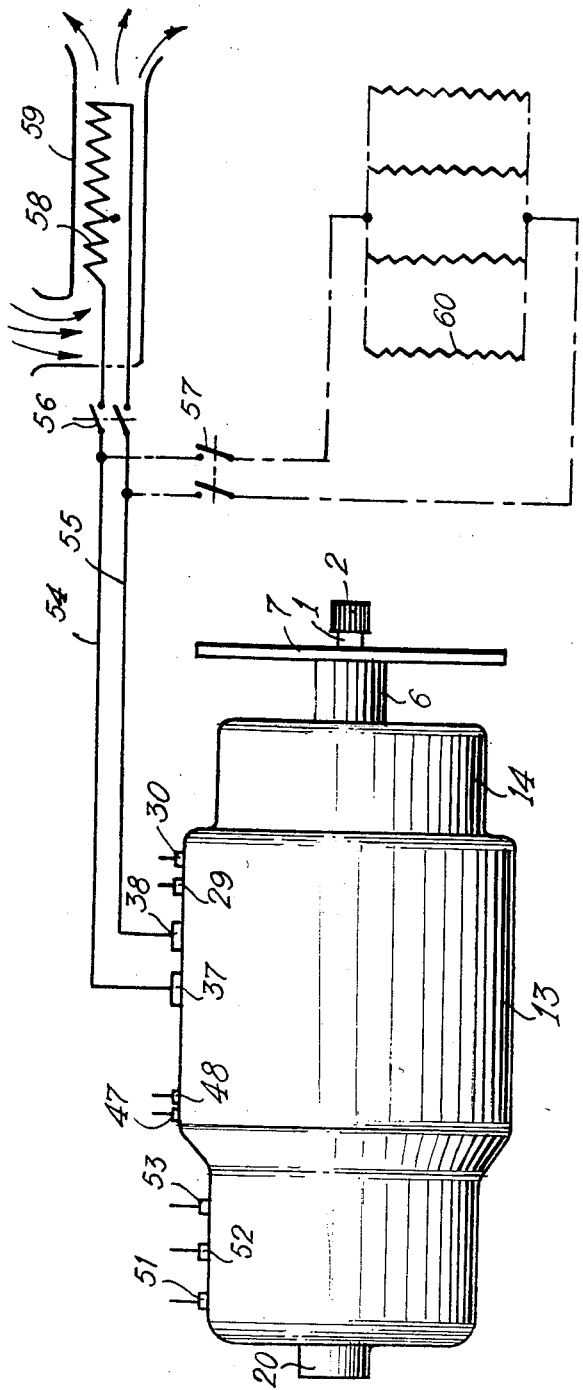

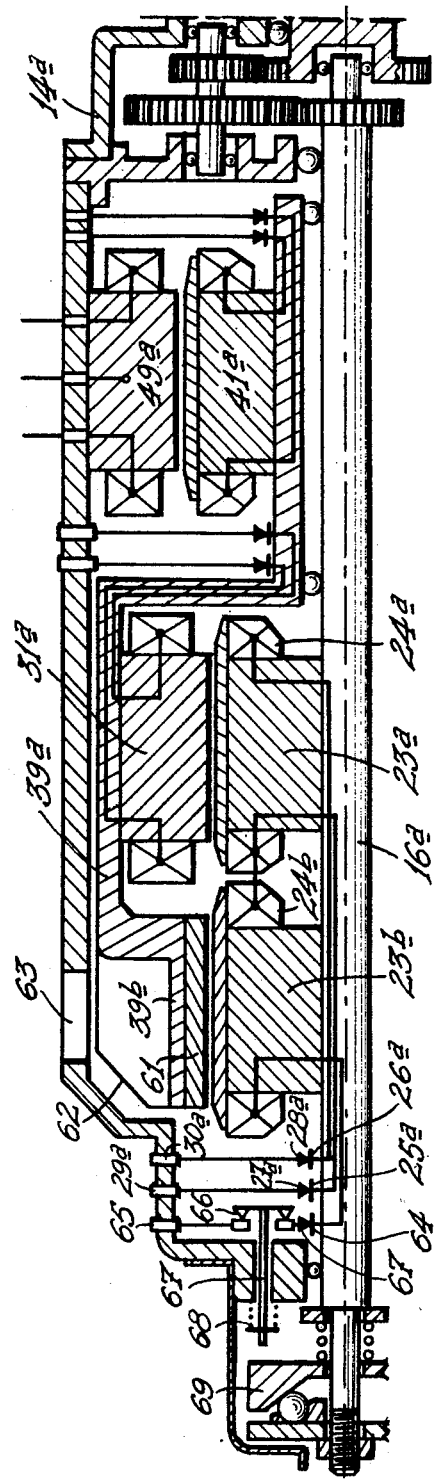

3,075,137
MACHINES WITH SLIP-DRIVES, PARTICULARLY AS APPLIED TO A.-C. GENERATORS
Pierre Etienne Bessiere, Neuilly-sur-Seine, France, assignor to Precision Mecanique Labinal, Saint-Ouen, France
Filed Jan. 20, 1960, Ser. No. 3,637
10 Claims. (Cl. 322—40)

The invention relates to systems which comprise a slip-type coupling interposed between a driving and a driven shaft, and refers particularly to machines of this type which find application in the field of aviation. Indeed, the energizing of certain types of electrical equipment installed in aircraft calls for electric current of constant frequency, which must be produced by power bled from the powerplant of such an aircraft.

Now such powerplants are operated at speeds that can be varied to a very great extent, especially in the case of jet engines or turbine engines of that type. The production of constant-frequency alternating current requires that a coupling be interposed between the shaft driven directly or indirectly by such a powerplant and the shaft of the A.-C. generator. Couplings resorted to hitherto are either costly or incapable of operating under certain conditions of power output.

This is in particular the case of hydraulic couplings, which function correctly but which are costly, tricky to adjust, and expensive to maintain. This likewise applies to slip-couplings of the eddy-current type, in which energy destroyed by the slipping process is wholly eliminated in the form of heat within the coupling itself, thus greatly restricting the magnitude of the power it is possible to apply to such couplings and rendering correct lubrication impossible, or bringing about rapid failure of the unit above a relatively low power level.

The chief aim of the present invention is to overcome these drawbacks by providing a coupling which is easy to execute, which requires virtually no maintenance, and which is of low cost and weight while at the same time being capable of operating efficiently under a wide variety of power output conditions.

According to the invention, the controlled-slip type coupling comprises an A.-C. generator of which one moving member, which constitutes the field magnet, is connected to the drive-shaft, while the other, which forms the armature, is integral with the rotor of the constant-frequency A.-C. generator, slip between the two moving members referred to being controlled according to the frequency, in such a way as to ensure that the latter remains constant regardless of any variations in the rotational speed of the drive-shaft.

Now whereas in a coupling system of the eddy-current clutch type, the energy due to slipping is entirely converted into heat within a rotor made of soft steel, which is the seat of the induced currents, and whereas also this energy, in the case of heavy slipping, may be such that the temperature of the rotor attains unduly high values through the impossibility of evacuating the heat—the temperature being such as to prevent correct lubrication or even destroy the unit—in the coupling of the type described hereinbefore the energy developed through the slipping action is almost entirely converted into an electric current which can be spent externally in the form of some reclaiming process or in the form of heat, at some place where it may prove useful.

The invention also includes a drive comprising, in combination, a multiplicity of elements having a diversity of characteristics, it being possible to use this drive either separately or in the form of sub-assemblies, or again in the form of assemblies individually adapted to the changing values of the driving speed and of the power transmitted by the coupling.

The invention embraces in particular constant-frequency A.-C. generators which make use of couplings as specified above in association with a frequency regulator acting, by amplification, upon the excitation system of the coupling so as to control the degree of slip thereof, this application being more particularly intended, but not exclusively so, for the field of aviation.

The description which follows with respect to the drawings, given by way of example only and not in a limiting sense, will give a clear undertanding of how the invention may be performed.

In the drawings, FIG. 1 is a diagrammatic half-section view of a constant-frequency generator.

FIG. 2 is a diagrammatic view of an installation for dissipating the energy generated by the slipping.

FIG. 3 shows, in similar fashion to FIG. 1, a possible variant.

Figure 1:
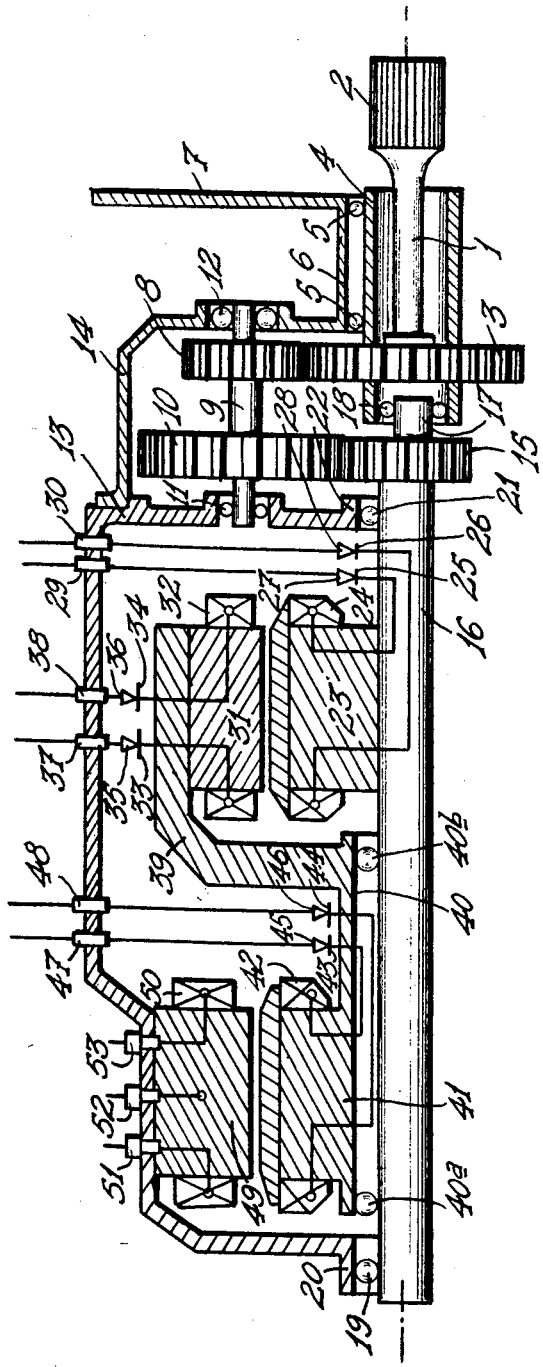

The machine illustrated in the drawings comprises a drive-shaft 1 capable of being coupled by means of a splined end-piece 2 into the corresponding receiving element of a power takeoff from a power plant, this shaft 1 being integral with a wheel 3 and a socket 4 which is supported by ball-bearings 5 within the bearing 6 of a flange 7 for coupling onto said power plant. The gear-wheel 3 meshes with a pinion 8 which is integral with a countershaft 9, onto which is mounted a further gear-wheel 10. The ends of the shaft 9 are supported by ball-bearings 11 and 12 which are provided inside suitable recesses of a casing 13 and a cover 14 containing, respectively, the generator and its coupling, and the reduction gearing. The gear-wheel 10 meshes with the pinion 15, which is integral with the shaft 16 of the unit, this latter shaft 16 being rotatable through the medium of its tip 17 and a ball-bearing 18 supported in the extremity of the socket 4. At its other end, the shaft 16 is supported by the ball-bearing 19 of the rear housing 20 provided in the casing 13, a further locating ball-bearing 21 being provided inside a housing 22 located in front, on the same side as the reduction gearing.

The shaft 16 is integral with a field magnet 23 whose windings 24 are connected to slip-rings 25 and 26 against which bear sliding contacts 27 and 28 which are themselves respectively connected to suitably insulated terminals 29 and 30 that protrude through the sides of the casing 13.

The field magnet 23 is surrounded by an armature 31 whose windings 32 are connected to slip-rings 33 and 34 against which press sliding contacts 35 and 36 which are themselves connected to suitably insulated terminals 37 and 38 likewise protruding through the casing 13.

The armature 31 is supported on a frame 39 which forms a cup-shaped receiving member for said armature and whose bottom is integral, via its centre, with a tubular element 40 capable of rotating about the shaft 16 through the medium of ball-bearings 40a and 40b. The end of the tubular element 40 is itself integral with a field magnet 41 whose windings 42 are connected to slip-rings 43 and 44 against which bear sliding contacts 45 and 46 which are connected to suitably insulated terminals 47 and 48 appearing through the casing 13.

The field magnet 41 is surrounded by an armature 49 integral with the casing 13, and the coils 50 of this field magnet, which are three-phase-wound, are connected to suitably insulated terminals 51, 52 and 53 appearing through the casing 13.

As may be seen in FIG. 2, terminals 37 and 38 are connected by means of conductors 54 and 55 to two-pole switches 56 and 57 which are capable of linking said conductors to a resistive element 58 placed inside a tunnel 59 within which circulates a cooling fluid, or else to heating elements 60 arranged in any desired position.

Terminals 29 and 30 are designed to be connected to a D.-C. source, with the interposition of a regulating system for the voltage and/or the intensity, in order to provide for variation in the excitation of the field magnet 23. Terminals 47 and 48 are intended to be connected to a D.-C. source, so that a suitable excitation-current may be caused to pass through the coils 42. Terminals 51, 52 and 53 are those from which are collected the alternating currents the frequency of which must remain fixed, and these currents are made to circulate inside a frequency-monitoring apparatus which is capable of affecting the value of the current applied to the terminals 29 and 30 which excite the field magnet 23.

Such an apparatus works in the following fashion: The end-piece 2 is coupled to the power takeoff of a turbojet for instance, this takeoff being capable of rotation at speeds ranging from 3,500 to 10,000 r.p.m. The step-up gearing, consisting of the gear-wheel 3, the pinion 8, the gear-wheel 10 and the pinion 15, doubles the rotational speed of the shaft 1. The field magnet 23 drives the armature 31 with a certain degree of slip, this slip being regulated by the characteristics of the exciter current led up to terminals 29 and 30, in such a way as to ensure that the rotational speed of the frame 39 remains substantially constant. Thus the rotational speed of the field magnet 41 is also constant and the currents produced in the armature 49 have a constant frequency.

Apart from losses, which are very small, the energy developed by the slipping action between the armature 31 and the field magnet 23 is converted in full into electrical energy in the coils 32. This energy can be applied to the resistive element 58, which will dissipate it by the Joule effect into the fluid which sweeps over the element in the tunnel 59. The energy can also be dissipated into heating plates 60 which, if desired, can be used as de-icers on exposed aerodynamic surfaces, or at any other point. Thus all the energy due to slipping can be completely dissipated outside the slip-coupling, so ensuring that the component elements of the coupling are protected, both mechanically and electrically, against drawbacks which result from the rise in their temperature, especially when the required degree of slip is very large.

Where relatively low speeds are involved, and for the case where the operating power of the A.-C. generator constituted by the field magnet 41 and the armature 49 is relatively high, obtainment of correct slip between the field magnet 23 and the armature 31 would lead to a form of construction wherein the pole faces of these elements would be too large.

In order to overcome this drawback, a mixed form of construction such as that shown in FIG. 3 may be adopted. In this particular form of construction, the constant-frequency of A.-C. generator comprises a field magnet 41a and an armature 49a which are brought over to the same side as the casing 14a of the step-up gearing. The frame 39a, which is placed the other way round to that shown in FIG. 1, is integral with the slip-coupling armature 31a, the corresponding field magnet 23a being integral with the drive-shaft 16a. An auxiliary field magnet 23b, which is likewise integral with the shaft 16a, is provided in proximity to the field magnet 23a, and this field-magnet faces, with but a slight gap in between, a drum 61, made for instance of soft-steel, which is integral with a narrower portion 39b of the frame 39, this narrower portion featuring cooling and ventilation fins 62 which cooperate with apertures 63 opposite them for circulation of the cooling air.

The windings 24a of the field magnet 23a are connected to the slip-rings 25a and 26a, but slip-ring 25a is furthermore connected to the windings 24b of the field magnet 23b, the second extremity of said windings 24b being connected to an auxiliary slip-ring 64. The sliding contacts 27a and 28a are connected to two terminals 29a and 30a in order to energize the windings 24a. An extra terminal 65 is provided, which is connected to a switch 66 which in turn allows it to be connected to the sliding contact 67 bearing against the slip-ring 64. The moving arm of this switch, which is integral with a pushrod 67, is pulled back into the position which closes the switch by a spring 68, and is pushed away into the open position by a ring 69 which forms part of a tachometer unit coupled to the shaft 16a.

At low speeds of rotation, the two portions of the slip-coupling function is parallel. As the driving speed rises and the degree of slip exceeds a given value, the switch 66 opens and automatically cuts off the exciter current to the eddy-current-type coupling, allowing only the slip-type A.-C. generator coupling to subsist. This arrangement prevents excessive power, which could raise the temperature of the unit to a dangerous level, from developing the eddy-current-type coupling.

It is noteworthy that the currents developed in armatures 31 or 31a, employed externally for some purpose or other, are capable of acting as auxiliary parameters for governing the slipping process, by modification of the characteristics of these currents. Thus it is possible to vary, by any well-known means, the impedance of the load circuit. Similarly, for very low rotational speeds of the drive-shaft, it would be possible to effect injections of current of regulated frequency into the windings 32 or 32a in order to alter the direction of the slip. The armature 31 could be wound in single-phase as shown in the drawings, or in multi-phase. Similarly, the armature 49, which generates the desired constant-frequency currents, could be multi-phase, as shown in the drawings, or else be wound in single-phase if required.

Moreover, it is to be clearly understood that many modifications may be made to the embodiments described hereinabove without departing from the scope of the invention. For example, in a composite-type coupling, the rendering inoperative of the basic eddy-current type coupling could be brought about not by a centrifugal cutout but by a relay operated by a tachometric A.-C. generator. Similarly, the function of monitoring the exciter current for the field magnet or field magnets of the coupling could be performed by apparatus which would be operated by the output frequency of the generator's armature, such apparatus additionally acting upon the currents in the armature of the slip-coupling's A.-C. generator.

What I claim is:

1. In a fixed frequency alternating currents generating machine driven by a shaft the rotational speed of which is variable and comprising, between an alternator and said shaft, an interposed slip coupling the slip-action of which is monitored by said fixed frequency alternating currents, in combination, at least a coiled field-magnet mechanically driven in rotation by said shaft, means for energizing said coiled field-magnet, at least a corresponding coiled armature, means for collecting electric currents elaborated in said armature, means for externally dissipating the energy of said electric currents with respect to said armature, a rotating supporting member for said armature, an alternator rotor disposed on said supporting member, means for exciting said rotor, and a corresponding alternator stator with terminals on which are collected said fixed frequency alternating currents.

2. A machine according to claim 1, in which said means for externally dissipating the energy of said electric currents with respect to said armature, comprise electrical resistors swept by a cooling fluid.

3. A machine according to claim 1, in which said means for externally dissipating the energy of said electric currents with respect to said armature, comprise electrical resistors arranged inside a ventilated tunnel.

4. A machine according to claim 1, in which said means for externally dissipating the energy of said electric currents with respect to said armature, comprise deicing electrical resistors arranged in exposed aerodynamic surfaces.

5. A machine according to claim 1, in which said means for externally dissipating the energy of said electric currents with respect to said armature, comprise electrical resistors the impedance of which is variable.

6. In a fixed frequency alternating currents generating machine driven by a shaft the rotational speed of which is variable and comprising, between an alternator and said shaft, an interposed slip coupling the slip-action of which is monitored by said fixed frequency alternating currents in combination, a plurality of coiled field-magnets mechanically driven in rotation by said shaft, means for energizing said coiled field-magnets, a corresponding plurality of armatures one at least of said armatures being a coiled armature, at least one other armature being a seat for eddy-currents, means for collecting electric currents elaborated in said coiled armature, means for externally dissipating the energy of said electric currents with respect to said armature, a rotating supporting member for said armatures an alternator rotor disposed on said supporting member, means for exciting said rotor, and a corresponding alternator stator with terminals on which are collected said fixed frequency alternating currents.

7. A machine according to claim 6, in which one of said armatures seat of eddy-currents is disposed in inductive relationship with one of said coiled field-magnet the excitation of which is made through a circuit on which is interposed regulating means for the circulating excitation current.

8. A machine according to claim 7, in which said regulating means are coupled to tachometric control means.

9. A machine according to claim 8, in which said regulating means comprise a switch.

10. In a fixed frequency alternating currents generating machine driven by a shaft the rotational speed of which is variable and comprising, between an alternator and said shaft, an interposed slip coupling the slip-action of which is monitored by said fixed frequency alternating currents, in combination, at least a coiled field-magnet, mechanically driven in rotation by said shaft, first slip-rings arranged on said field-magnet, sliding contacts on said first slip-rings, terminals connected on said sliding contacts, at least a coiled armature in front of said field-magnet, second slip-rings arranged on said armature, second sliding contacts on said second slip-rings, second corresponding terminals connected to said second sliding contacts, means for externally dissipating the energy of electric currents collected on said second terminal with respect to said armature, a bell-shaped member coaxially disposed with respect to said shaft rotatably mounted thereon, with a flaired portion integral with said armature and with a narrow portion integral with an alternator rotor, coils on said rotor, means for exciting said rotor, and an alternator stator the coils of which are electrically connected to terminals on which are collected fixed frequency alternating elements.

References Cited in the file of this patent
UNITED STATES PATENTS

| | | |
|---|---|---|
| 2,682,618 | Jaeschke | June 29, 1954 |
| 2,883,611 | Fuge | Apr. 21, 1959 |